United States Patent [19]

Pittaro

[11] 3,872,715
[45] Mar. 25, 1975

[54] ULTRASONIC PULSE-ECHO GATE CIRCUIT

[75] Inventor: Richard J. Pittaro, Stamford, Conn.

[73] Assignee: Krautkramer-Branson, Incorporated, Stamford, Conn.

[22] Filed: Feb. 13, 1974

[21] Appl. No.: 441,978

[52] U.S. Cl. .............................................. 73/67.9
[51] Int. Cl. ......................................... G01n 29/04
[58] Field of Search ........................... 73/67.8, 67.9

[56] References Cited
UNITED STATES PATENTS

| | | | |
|---|---|---|---|
| 3,221,544 | 12/1965 | Gunkel | 73/67.8 S |
| 3,792,613 | 2/1974 | Couture | 73/67.9 |
| 3,805,597 | 4/1974 | Ohta et al. | 73/67.9 |

Primary Examiner—Charles A. Ruehl
Attorney, Agent, or Firm—Ervin B. Steinberg

[57] ABSTRACT

A pulse-echo test circuit includes a plurality of sequentially operable gates, each gate for passing a defect responsive signal to a storage means. Each gate is controlled to close responsive to the receipt and passage of a single defect responsive signal, which signal is used also to open a heretofore closed gate. Hence, the gates rather than being time controlled are controlled responsive to the incidence of the defect responsive signals. The stored signal in the preferred example is the peak amplitude in digital form and is associated with a second digital value related to the location of the defect in the workpiece.

20 Claims, 3 Drawing Figures

3,872,715

ULTRASONIC PULSE-ECHO GATE CIRCUIT

BACKGROUND OF THE INVENTION

The present invention refers to an electrical circuit for use in nondestructive testing of materials using ultrasonic energy, and more specifically concerns a gate and counting circuit for detecting and registering an undetermined quantity of randomly disposed defects in a workpiece. Such a circuit has wide application in porosity testing, material sorting, and general nondestructive defect detection testing using the ultrasonic pulse-echo principle.

In the prior art arrangements sequentially operated predetermined pulse width timing gates are known wherein defect responsive echo signals are registered in gates which are open during apparent time intervals. The limitation of such a system becomes apparent when multiple defect responsive signals are received during the same gate interval; that is, two defects are closely spaced within a particular workpiece region. Additional problems are manifest when a defect responsive signal is received at the timing gate transition time. In this latter case, the possibility exists that a defect responsive signal will not be processed.

A prior art solution for overcoming the stated shortcomings has been to overlap successive time gate intervals so as to assume continuous scanning of the workpiece. The difficulty with this latter type arrangement arises when a defect signal is received during the interval in which two gates overlap, causing the signal responsive to a single defect to be registered as two defects. In order to preclude such an ambiguity, a coincidence circuit is usually added to the system to determine whether one defect or two defects are present in the workpiece.

The instant invention discloses an arrangement in which the timing gate interval is responsive to the defect responsive signals received from the workpiece. The timing gate, instead of being time controlled, retains its set condition and changes its condition responsive to the receipt of a defect responsive signal exceeding a predetermined minimum amplitude. The improvement obviates the necessity for a coincidence circuit, expensive timing circuits and yields far more accurate and reliable results, especially those that are free from ambiguity.

A principal object of this invention, therefore, is an arrangement for detecting closely spaced flaws exceeding a predetermined amplitude.

Another principal object of the present invention is the provision of a simplified circuit for detecting multiple, randomly disposed, defects in a workpiece.

Another important object of this invention is to provide timing gates responsive to the receipt of defect responsive echo signals.

A further significant object of this invention is the provision of a novel circuit for use in conjunction with ultrasonic pulse-echo nondestructive testing.

Further and still other objects of this invention will become more clearly apparent by reference to the following description when taken in conjunction with the accompanying drawings.

DETAILED DESCRIPTION OF THE PREFERRED EMBODIMENT

Figure 1:
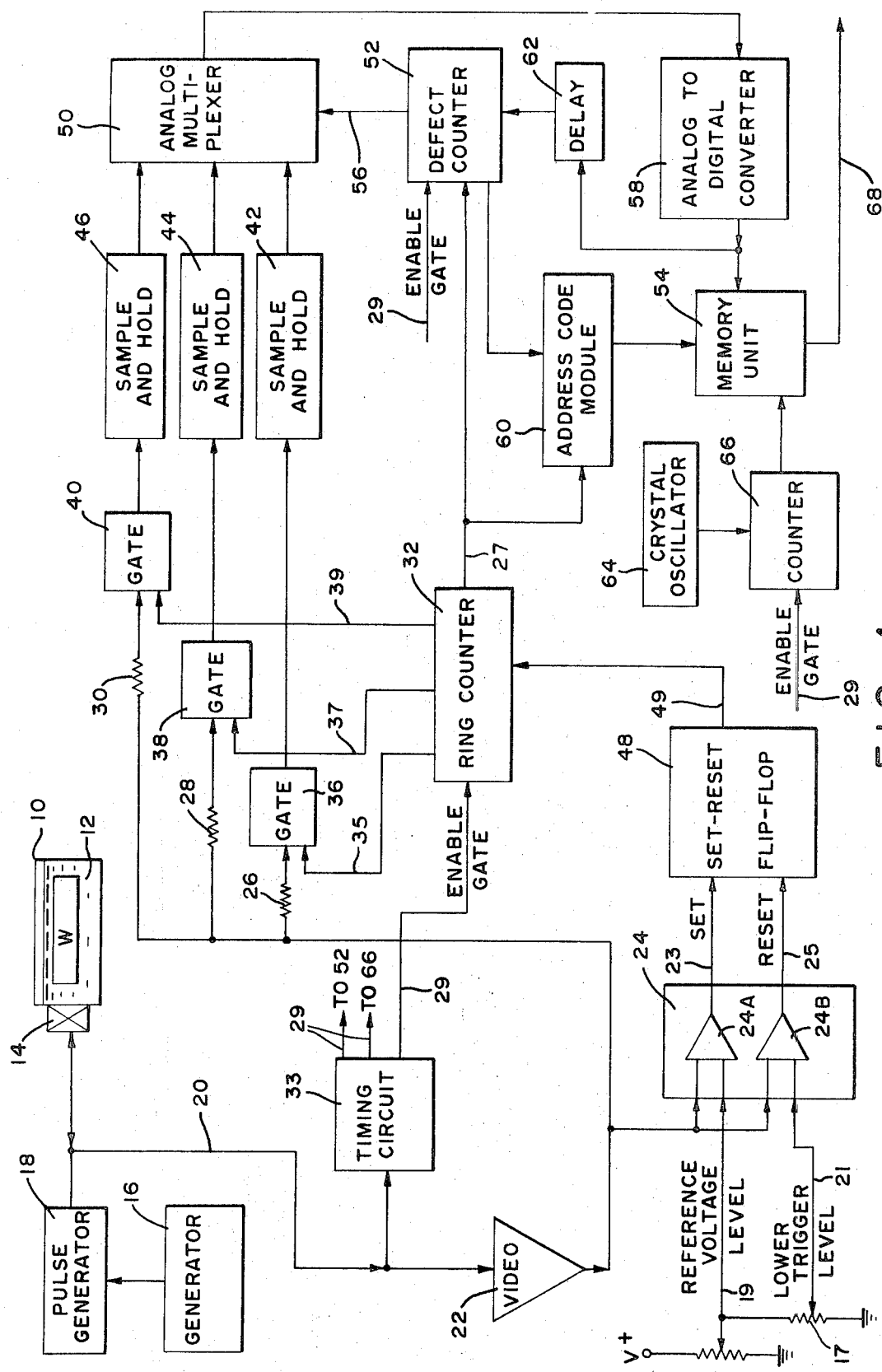
FIG. 1 is a schematic block diagram of a preferred embodiment of the present invention.

Referring now to the figures and FIG. 1 in particular, a workpiece W is disposed in a liquid coupling medium 12, such as water, confined in a container 10. A pulse-echo ultrasonic transducer 14 is coupled to one side wall of the container 10. The ultrasonic transducer 14 converts the electrical high frequency energy provided by the generator 16 and pulse generator 18 into ultrasonic energy and such energy is transmitted from the transducer 14 through the coupling medium 12 to the workpiece W where a portion of the energy is reflected at the front or entrant surface, at the rear surface and by any defects disposed within the workpiece W. The reflected ulstrsonic signals are received by the transducer 14, converted to defect responsive echo electrical signals and conducted by means of conductor 20 to a video amplifier 22.

In the circuit illustrated, three gate elements are shown for the sake of simplifying the description of the invention. In the preferred embodiment additional gates may be used, typically eight or sixteen gates so as to provide compatability with a standard decoder circuit, such as Texas Instruments, Inc. device No 74154 (not shown in FIG. 2). To expand the shown circuit into the preferred embodiment, additional gates coupled to the decoder are added. Also, each gate circuit will be coupled to a respective resistor and sample and hold circuit as will be more evident from the ensuing description.

As depicted, an echo responsive video signal from the video amplifier 22 is conducted to a comparator circuit 24 and to resistors 26, 28, and 30. During the interval in which a defect responsive signal is anticipated, an enable gate signal is provided by conductor 29 from the timing circuit module 33 to the ring counter 32. A ring counter is well-known to those skilled in the art, see for instance "Pulse, Digital and Switching Waveforms" (book), by Millman and Taub, McGraw Hill Book Company, New York, New York, 1965, pages 693–698. The timing circuit 33 which generates the enable gate signal provides electronic timing delay signals by means of a combination of multivibrators and logic gates.

Figure 3:
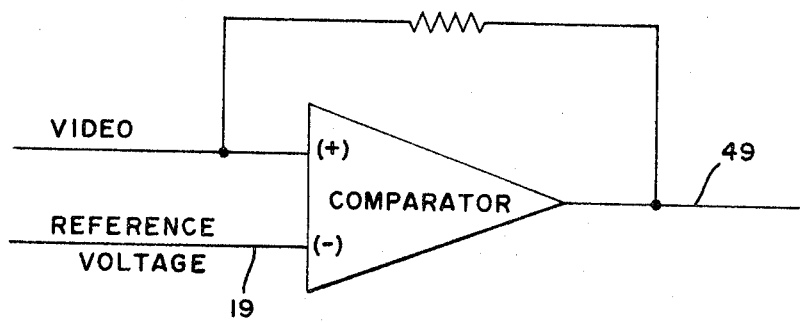
FIG. 3 is a schematic block diagram of an alternative circuit for the comparator circuit shown in FIG. 1.

The enable gate signal along conductor 29 resets the ring counter 32 to its first count, causing the output signal on conductor 35 to be in the high state and causing the first gate 36 to be open. Simultaneously, the remaining output signals from the ring counter 32, conductors 37 and 39, are in the low state to cause the gates 38 and 40 to be closed. The term "open" shall be defined to mean that if a video signal is present at one of the resistors 26, 28, or 30, such signal will be conducted through the open gate to the respective sample and hold circuit 42, 44, or 46. At the same time a video signal present at the other resistors will not be transmitted to the respective sample and hold circuit because of the closed condition of the gates. To further illustrate this arrangement, if gate 36 is open and gates 38 and 40 are closed, a video signal from the video amplifier 22 will be conducted via resistor 26 and gate 36 to the sample and hold circuit 42, whereas the same video signal will not be conducted through gates 38 and 40 to their respective sample and hold circuits 44 and 46. The comparator circuit 24, in the preferred embodiment, includes two comparators 24A and 24B to provide hysteresis for the purpose of preventing erroneous triggering upon the receipt of a noise signal from the video amplifier 22. An alternative embodiment for the combination of circuit 24 and setreset flip-flop 48 comprises the use of a single comparator with a feedback resistor connected from the output of the comparator to the positive input terminal of the comparator as shown in FIG. 3.

An adjustable reference voltage level 19 is provided to comparator circuit 24 and fed as an input signal to the comparator 24A. In addition, a lower trigger level signal 21 derived from potentiometer 17 is supplied to the comparator circuit 14 and fed to comparator 24B. When a defect responsive video signal having an amplitude greater than that of the reference voltage level, conductor 19, is received by the comparator circuit 24, the comparator 24A produces a positive output pulse by means of conductor 23 to the set input of the set-reset flip-flop 48, causing the output 49 of the set-reset flip-flop 48 fed to the ring counter 32 to be in the high state. When the amplitude of the video signal from the amplifier 22 subsequently becomes less than the low trigger level of the comparator circuit 24, the comparator 24B will provide an output signal by means of conductor 25 to the reset input of the set-reset flip-flop 48. The trailing edge of the output signal of the set-reset flip-flop 48, responsive to the reset input, on conductor 49 causes the ring counter 32 high state output to advance to the next output, i.e., from conductor 35 to conductor 37, or from conductor 37 to conductor 39. The output signals from the ring counter 32 are connected to respective gates for causing the open gate 36 to close and the subsequent gate 38 to open. The peak amplitude of the defect responsive video signal passing through gate 36 is fed to a sample and hold circuit 42 which provides temporary storage for further processing as will be discussed hereinafter. When gate 36 closes, gate 38 is open to permit the next defect responsive video signal to be stored in the associated sample and hold circuit 44.

The set-reset flip-flop 48 cooperates with the comparator circuit 24 to provide hysteresis and timing information. After the comparator circuit 24 receives the defect responsive video signal, the set-reset flip-flop 48 provides a trigger pulse signal to the ring counter 32 to cause a change of the state in the output signal of the ring counter 32. The trigger pulse signal trailing edge on conductor 49 is responsive to the defect responsive video signal amplitude falling below the lower trigger level signal 21 of the comparator 24B. In this manner, the entire defect responsive video signal is received in a respective sample and hold circuit via the associated resistor and open gate. The peak amplitude of the video signal is stored in the respective sample and hold circuit.

It should be understood from the description, that by causing the open gate to remain open until after receipt of an entire defect responsive video signal and then closed, and at the same instant causing a subsequent gate to be opened, defects randomly disposed in a workpiece will be recieved without the prior art problems of double counting and signals received during the pulse transistion intervals. The ring counter 32 in the present invention, only counts defect responsive signals which are above a predetermined level as determined by the voltage of conductor 19.

Also, the gate periods are not of a predetermined fixed time duration and constant frequency; rather they are responsive to defect responsive signals received by the video amplifier having an amplitude greater than the predetemined reference voltage level.

The signals stored in the sample and hold circuits are coupled to an analog multiplexer 50. The analog multiplexer 50 sequentially couples the information from each of the sample and hold circuits to an analog to digital converter 58 which is controlled responsive to signals from the defect counter 52. The programming of the defect counter 52 will be explained hereinafter. The ring counter 32, in addition to providing signals to the gate circuits, also provides signals to the counter 52 and to the address code module 60. The defect counter 52 counts "up" the number of pulses on conductor 27 which correspond to the quantity of defect responsive video pulses received by the comparator circuit 24 and counted by the ring counter 32 during the time in which the enable gate signal on conductor 29 is present at both the ring counter 32 and the defect counter 52, viz. the interval of anticipated receipt of defect responsive echo signals. In the time interval during which there is no anticipated defect responsive echo signals, when the enable gate signal is absent, the defect counter 52 begins to count "down" the quantity of defect responsive video signals counted. The output signal of the counter 52 is connected by means of a conductor 56 to the analog multiplexer 50. The output signal from the counter 52 causes successive sample and hold circuits to be directly connected, signularly, to the analog to digital converter 58. The analog to digital converter 58 converts the peak amplitude of the defect responsive video analog signal stored in the sample and hold circuit to a digital suitable for storage in the memory unit 54. The counter 52, after the analog to digital converter 58 converts the defect responsive video signal to a digital signal, provides signals to the address code module 60. The address code module 60 provides the sequencing information to the memory unit 54 by means well-known to those skilled in the art and does not constitute part of the present invention. The address code module 60 assures that the information contained in the sample and hold circuit is stored in the proper section of the memory unit 54 for later recall.

The above described process is repeated until all sample and hold circuits 42, 44, and 46 have been connected via the analog multiplexer 50 and the analog to digital converter 58 to the memory unit 54. All information from the sample and hold circuits is then contained in the proper memory storage by means of address code module 60.

Additionally, there is provided a delay means 62 coupled between the analog to digital converter 58 and the defect counter 52. The delay means 62 is provided to allow the analog signals from the sample and hold circuit in the analog to digital converter 58 to attain their steady state value prior to conversion to digital format for storage in the memory unit 54. After the analog to digital converter 58 converts the defect responsive video information to digital format and such information is stored in the memory unit 54, the signal from the delay means 62 causes the counter 52 to count "down"

another defect and the cycle repeats for the next defect.

The information obtained in the above described arrangement provides amplitude and quantity of randomly disposed defects in a workpiece. It is also desirable to have information related to the absolute position of such defects.

The circuits used to obtain such information is well-known to those skilled in the art and comprises a crystal oscillator 64 and a counter 66. The counter 66 during the time the enable gate signal is present, counts the quantity of pulses of a fixed frequency from the crystal oscillator 64 during the time interval beginning with the introduction of the ultrasonic energy into the entrant surface of the workpiece. The receipt of a defect responsive video signal above a predetermined minimum amplitude causes the set-reset flip-flop 58 to provide a trigger pulse signal to the ring counter 32 which, in turn provides an output signal on conductor 27 to the address code module 60. Upon receipt of the output signal on conductor 27, the memory unit 54 receives a control signal from the address code module 60 to store the then attained count of the counter 66 in the storage for the associated defect. The count from the counter 66 can be converted to distance by known means. The output signal of the ring counter 32 on conductor 27 also causes the defect counter 52 to count "up" one additional defect. The defect counter 52 provides a signal to the address code module 60 that identifies which defect is to be stored in the memory unit 54 so as to permit proper recall of the information at a later time. This cycle of operation is repeated upon the arrival of the next defect responsive signal.

The information in the memory unit 54 now contains the amplitude and the location of each defect, as described above, the location of each defect with reference to the entrant surface of the workpiece, assuming that the timing circuit 33 is adjusted to provide the enable gate signal at the moment the ultrasonic search beam enters the workpiece, commonly known as interface triggering. The stored information from each cycle of operation (each pulse of ultrasonic energy transmitted into the workpiece at the pulse repetition rate and the associated defect responsive echo signals) is provided via conductor 68 to an evaluation unit. The evaluation unit performs signal averaging of the individual defect responsive echo signals to provide a signal for evaluating, for instance, the porosity and strength of the workpiece W.

Figure 2:
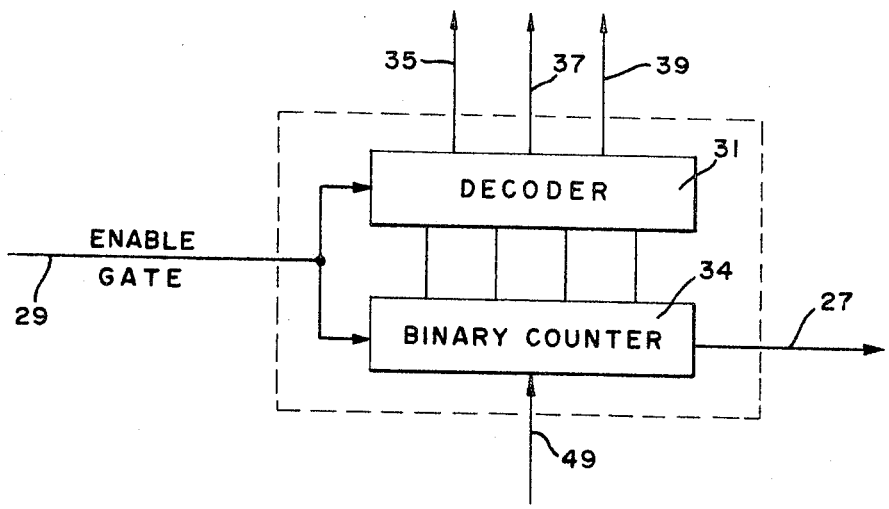
FIG. 2 is a schematic block diagram of an alternative circuit for the ring counter shown in FIG. 1.

An alternative circuit which may be employed in lieu of a ring counter 32 is shown in FIG. 2. The circuit comprises a binary counter 34 and a decoder 31. A typical binary counter is Texas Instruments, Inc. part No. 74191. The enable gate signal as described hereinabove resets the binary counter 34 to zero which causes the first output signal on conductor 35 of the decoder circuit 31 to be in the high state while the remaining output signals are in the low state, hence causing the gate 36 to be opened and gates 38 and 40 to be closed.

The output trigger signal from the set-reset flip-flop 48, provided by means of conductor 49, triggers the binary counter 34 to add one count, causing the high state output signal of the decoder 31 to now be at output conductor 37. At the same time, the other outputs are in the low state. The result is that the gate 38 is now open and gates 36 and 40 are closed. The process continues each time an additional defect responsive video signal is received until each gate has, in sequence, been opened and closed.

The trailing edge of the enable gate signal on conductor 29, causes the number of pulses counted by the binary counter 34 to be fed directly into defect counter 52. The defect counter 52 is then present to the number of defect responsive video signals received by the comparator circuit 24 of amplitude greater than the reference voltage level signal 19. The process of counting down and storing the information in the memory unit 54 is as described hereinabove except that the number of the particular defect is now contained in binary counter 34. This information is provided to the address code module 60 by means of conductor 27 to assure that the defect information is stored in the proper storage of the memory unit 54 for later recall.

In order to perform a subsequent test on the same or another workpiece, the enable gate signal on conductor 29 zeroizes the test system. The enable gate signal resets ring counter 32, defect counter 52, and zeroizes counter 66 to permit the system to receive, register, and record the defect responsive echo signal information.

In another alternative embodiment of the present invention, the sample and hold circuit may be replaced by an averaging or root mean square circuit instead of the peak detector.

The multiple sample and hold circuits in combination with a single analog multiplexer and a single analog to digital converter may be replaced by a peak detector and an analog to digital converter associated with each gate circuit. In this alternative embodiment the resulting digital signals will be conducted directly to a memory module for storage.

In a further embodiment, the address code module and memory module can be replaced by a random access memory module. The random access memory module performs the same function as the two above mentioned modules. In a still further embodiment the analog signal from the gate circuit is not converted to a digital signal; instead, the signal in analog form is processed to determine the porosity and strength of the workpiece W.

What is claimed is:

1. A circuit for an ultrasonic nondestructive test apparatus comprising:
   transducer means adapted to be coupled to a workpiece for transmitting an ultrasonic search beam into the workpiece and for receiving echo signals therefrom arising from defects intercepted by said beam;
   means coupled for receiving said defect responsive echo signals and for providing defect responsive output signals;
   gate means including a plurality of gates coupled for receiving said output signals, one of said gates being open and the remaining gates being closed;
   means coupled to said gate means for causing an open gate to close and a closed gate to open responsive to the receipt of a respective one of said output signals, and
   means coupled to each of said gates for receiving the information provided by said output signals and conducted through said gate means.

2. A circuit for an ultrasonic nondestructive test apparatus as set forth in claim 1, said means coupled to each of said gates for receiving the information provided by said output signals comprising signal storage means causing the information stored to be the peak amplitude of the respective output signals.

3. A circuit for an ultrasonic nondestructive test apparatus comprising:
    transducer means adapted to be coupled to a workpiece for transmitting an ultrasonic search beam into the workpiece and for sequentially receiving echo signals therefrom arising from defects intercepted by said beam;
    means coupled for receiving said defect responsive echo signals and for providing sequentially defect responsive electrical output signals;
    a plurality of sequentially and individually operable gate means;
    means for causing a first one of said plurality of gate means to be open for receiving a first one of said output signals while causing the other ones of said gate means to be closed;
    means coupling said output signals to said gate means and causing each output signal in predetermined sequence to respectively close an open gate means and simultaneously to open a closed gate means,
    whereby to cause the sequential opening and closing of the individual gate means to be responsive to the time interval between the receipt of defect responsive output signals.

4. A circuit for an ultrasonic nondestructive test apparatus as set forth in claim 3, and means coupled in circuit with said means for receiving said defect responsive echo signals and said means coupling said output signals to said gate means for causing closing and opening of a respective gate means only when the respective output signal exceeds a predetermined amplitude.

5. A circuit for an ultrasonic nondestructive test apparatus as set forth in claim 4, said means coupled in circuit with said means for receiving said echo signals comprising a comparator circuit.

6. A circuit for an ultrasonic nondestructive test apparatus as set forth in claim 5, and storage means coupled to each of said gate means for storing a value commensurate with a respective output signal passing through a respective open gate means.

7. A circuit for an ultrasonic nondestructive test apparatus as set forth in claim 6, and means coupled for causing said stored value to be commensurate with the peak value of the respective output signal.

8. A circuit for an ultrasonic nondestructive test apparatus as set forth in claim 7, and means coupled for converting the peak value of each respective signal to a digital value.

9. A circuit for an ultrasonic nondestructive test apparatus as set forth in claim 8, and memory means coupled for receiving and storing said digital values, and further means coupled for associating each of said digital values stored with a second value indicative of the location of the defect in the workpiece.

10. A circuit for an ultrasonic nondestructive test apparatus comprising:
    ultrasonic pulse generating means;
    transducer means coupled to said pulse generating means and adapted to be coupled to a workpiece for transmitting an ultrasonic search beam into the workpiece and for subsequently receiving echo signals from the workpiece, each echo signal being responsive to a defect intercepted by said beam while traversing the workpiece;
    means coupled for receiving said defect responsive echo signals from said transducer means and for providing electrical output signals, each output signal being responsive to a respective echo signal;
    gate means comprising a plurality of sequentially operable individual gates;
    means coupled for causing one of said gates to be open and the remaining gates to be closed;
    signal storage means coupled to said gates for receiving and storing signals passed through respective open gates;
    means coupling said output signals to said gate means and controlling said means for causing one of said gates to be open in a manner to cause each output signal to pass through a respective open gate and to close such respective open gate when the trailing edge of the respective output signal decreases to a predetermined level while concomitantly opening in predetermined sequence a previously closed gate for passing a succeeding output signal, and
    means coupled in circuit with said means for receiving said defect responsive echo signals and said means controlling said gate means for closing a respective open gate and for opening a respective closed gate only in response to the amplitude of a respective output signal exceeding a predetermined minimum signal level.

11. A circuit for an ultrasonic nondestructive test apparatus as set forth in claim 10, and means coupled for rendering said minimum signal level adjustable.

12. A circuit for an ultrasonic nondestructive test apparatus as set forth in claim 10, said means causing one of said gates to be open including a ring counter.

13. A circuit for an ultrasonic nondestructive test apparatus as set forth in claim 10, said means causing one of said gates to be open including a binary counter coupled to a decoder.

14. A circuit for an ultrasonic nondestructive test apparatus as set forth in claim 10, and means coupled between said transducer means and said gate means for zeroizing said gates to cause a first predetermined gate to be open and the remaining gates to be closed responsive to said generating means causing said transducer means to transmit said search beam.

15. A circuit for an ultrasonic nondestructive test apparatus as set forth in claim 10, a sample and hold circuit coupled to each of said gates for extracting from the signal passed through a gate the peak amplitude value of such signal, means coupled for converting the amplitude valve from the analog form to a digital value, and means causing the digital value to be entered in said storage means for subsequent retrieval therefrom.

16. A circuit for an ultrasonic nondestructive test apparatus as set forth in claim 15, said storage means comprising random access memory means, and means coupled to said storage means for associating a respective value responsive to a defect with a second value indicative of the location of such defect in the workpiece.

17. A circuit for an ultrasonic nondestructive test apparatus as set forth in claim 16, said means coupled to said storage means for associating a respective value with a value indicative of the location of a defect including a crystal controlled oscillator and a counter driven by said oscillator and coupled to said storage means for providing a count responsive signal to said storage means, and means for starting said counter from a zeroized position responsive to said transducer means transmitting a beam.

18. The method of testing a workpiece by the pulse-echo ultrasonic test method comprising:
producing an ultrasonic search beam;
transmitting said beam into a workpiece to be tested and receiving sequentially defect responsive echo signals resulting from said beam intercepting defects disposed in the workpiece;
transforming said receieved echo signals into respective electrical output signals;
coupling said received output signals through an arrangement comprising a plurality of individually operable gates to further means;
controlling said plurality of gates in a manner to cause one of said gates to be open for passing a respective output signal to said further means while causing the remaining gates to be closed, and
causing the trailing edge of a respective output signal in predetermined sequence to close an open gate and open a heretofore closed gate.

19. The method of testing a workpiece by the pulse-echo ultrasonic test method as set forth in claim 18, said further means comprising signal storage means, and passing said respective output signals to said storage means only if the amplitude of such signal exceeds a predetermined amplitude.

20. The method of testing a workpiece by the pulse-echo ultrasonic test method as set forth in claim 19 and storing in said storage means a value responsive to the peak amplitude of each respective output signal.

* * * * *